M. L. & B. W. MARTUS.
MILK BOTTLE HOLDER.
APPLICATION FILED MAY 22, 1912.
1,053,103.
Patented Feb. 11, 1913.
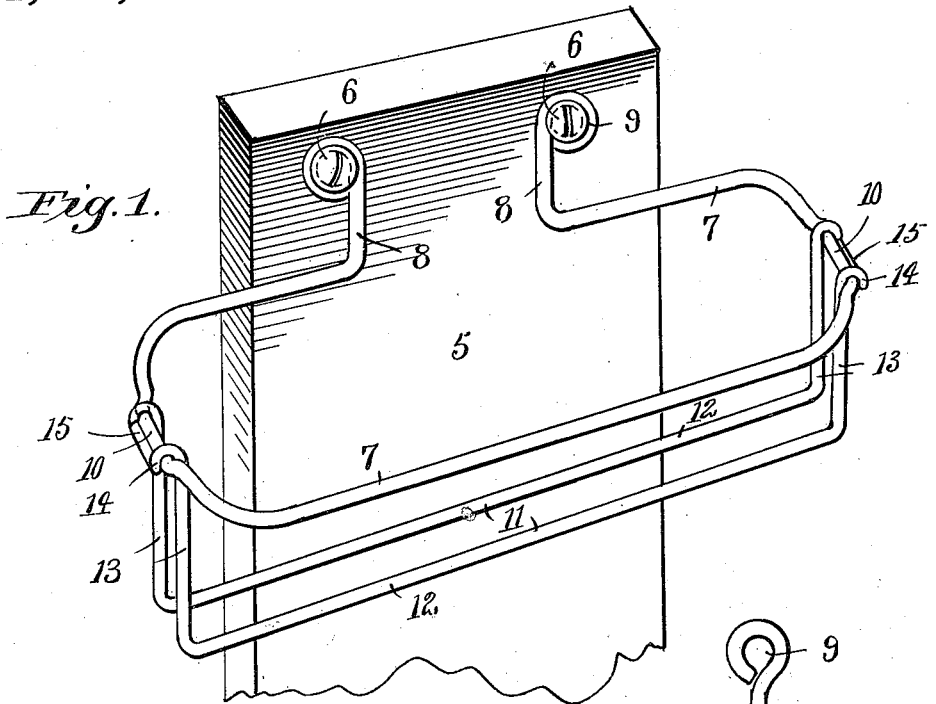
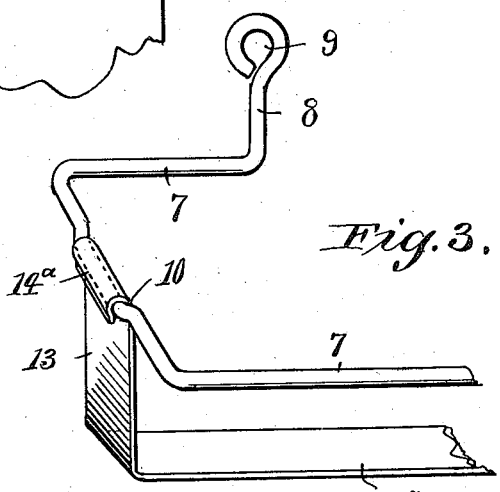
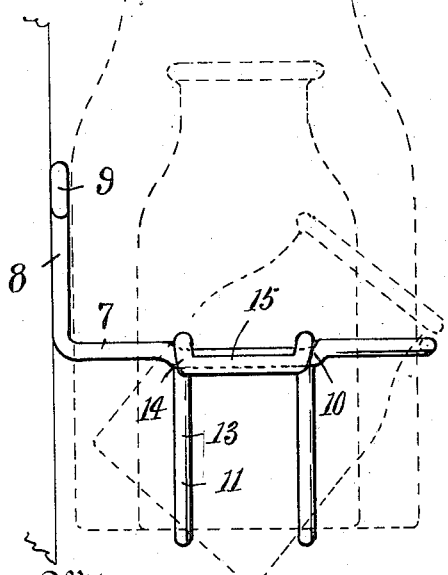
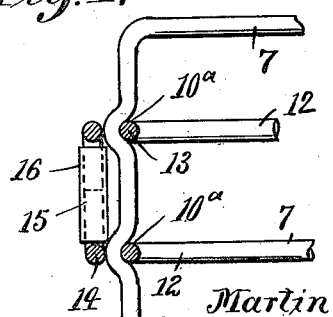
Witnesses
Mildred Macleod
Ivan L. Morehouse
Inventors
Martin L. Martus and
Bertram W. Martus
By Chamberlain & Newman Attorney

UNITED STATES PATENT OFFICE.

MARTIN L. MARTUS, OF WATERBURY, AND BERTRAM W. MARTUS, OF NEW HAVEN, CONNECTICUT.

MILK-BOTTLE HOLDER.

1,053,103. Specification of Letters Patent. Patented Feb. 11, 1913.

Application filed May 22, 1912. Serial No. 698,950.

*To all whom it may concern:*

Be it known that we, MARTIN L. MARTUS and BERTRAM W. MARTUS, citizens of the United States, and residents of Waterbury and New Haven, respectively, in the county of New Haven and State of Connecticut, have invented certain new and useful Improvements in Milk-Bottle Holders, of which the following is a specification.

Our invention relates to milk bottle holders, and is adapted to be secured to a portion of a building and adjacent to the door for the purpose of receiving the milk bottles to be delivered and collected by the milkman each day.

The purpose of the invention is to provide a simple and inexpensive form of holder for the above purpose which will be large enough to receive several bottles of different sizes if required and whereby the same will be supported and retained against the side of the building, up off of the floor or ground, and thereby out of reach of dogs, cats and the like, thereby insuring a clean and sanitary device. Further to provide a holder of the above class which can be knocked down for packing and shipment and which can be readily reassembled or put together preparatory to being sold or attached to a building.

With these and other objects in view the invention resides and consists in the construction and novel combination and arrangement of parts hereinafter more fully described, illustrated in the accompanying drawings, and pointed out in the claims hereto appended, it being understood that various changes in form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 shows a perspective view of our improved form of sanitary milk bottle holder as it would appear when attached to part of a building or post. Fig. 2, is an end view of the same as seen from the left of Fig. 1, several milk bottles of different sizes being indicated therein by dotted lines. Fig. 3, is a detail perspective view of one end portion of a milk bottle holder constructed in accordance with our invention and illustrating the use of a flat wire bottom supporting piece instead of the two strand round wire shown in the other forms, and Fig. 4, shows a sectional plan view of a further modified form of construction.

Referring in detail to the characters of reference marked upon the drawings 5 represents any suitable portion of a building to which our milk bottle holder may be attached as by means of screws 6—6.

The holder proper is preferably formed of two suitably bent and formed pieces of round wire. The top or frame member 7 being preferably shaped to form an oblong loop, though it can be square or round if preferred, and has its end portions 8 disposed upward at a right angle and parallel with each other and said end extremities curled around to form the two eyes 9 through which the screws 6 are placed for the attachment of the holder to a building. The opposite end portions of the looped frame member 7 are off set to form the holding notches 10—10 to which the second bottom wire member 11 is detachably connected. This second piece 11 is preferably made of a continuous piece of wire which is bent to form the two parallel bottom portions 12—12, the vertical end members 13, the upper hook members 14 and the intermediate portions 15 which connect the two bottom and side portions together. One of these intermediate portions 15 may be solid or continuous, while the other is formed of the abutting end portions of the wire, and then covered by a sheet metal ferrule 16 or may be butt-welded as prepared, thereby holding the respective parts in place and rigid with respect to each other and the supporting frame to which they are connected. The hook portions 14 are closed around sufficiently to permit them to be snapped on to the frame and would be formed of material that would insure a permanent though detachable engagement of the said parts when thus connected. The intermediate portions 15 may be straight as shown in Fig. 1, or bowed up as shown in Fig. 2.

In Fig. 3 we have shown the bottom member $11^a$ formed of one strand of flat wire, the same having vertically arranged end portions $13^a$ and hooks $14^a$ formed of the end extremities of said flat wire to permit of the detachable connection of the bottom member to the frame member 7.

The modification shown in Fig. 4 illustrates the formation of two notches 10ᵃ in the ends of the frame member 7 for the engagement of the respective hooks 14 of the wires 13.

Having thus described our invention what we claim and desire to secure by Letters Patent is:—

1. A milk bottle holder comprising a wire frame member bent to form an oblong loop and eyes for the attachment or fastening of the holder to a building or other support and having notches formed in the end portions of said loop, a bottom supporting member extended longitudinally of and below the loop frame and having upwardly disposed end portions and hooks to engage the notches in the opposite ends of the wire frame.

2. A milk bottle holder comprising a wire frame member bent to form a loop and means for the attachment of the frame to a building and having notches formed in the said loops, a bottom supporting member extended across and below the loop frame and having upwardly disposed end portions and hooks to detachably engage the notch portions of the opposite ends of the wire frame.

3. A milk bottle holder comprising a one piece wire frame member bent to form a longitudinal front portion, notched end portions, parallel rear side portions having upwardly disposed ends with eyes for the attachment of the frame, a bottom supporting member extended across and below the wire frame and having upwardly disposed end portions with hooks to detachably engage the notch portions of the opposite ends of the wire frame.

Signed at New Haven, in the county of New Haven and State of Connecticut this 15th day of May, A. D., 1912.

MARTIN L. MARTUS.
BERTRAM W. MARTUS.

Witnesses:
BARNETT BERMAN,
SAM ZASLAW.